United States Patent [19]

Ng

[11] Patent Number: 4,686,620
[45] Date of Patent: Aug. 11, 1987

[54] DATABASE BACKUP METHOD

[75] Inventor: Fred K. Ng, Naperville, Ill.

[73] Assignee: American Telephone and Telegraph Company, AT&T Bell Laboratories, Murray Hill, N.J.

[21] Appl. No.: 634,460

[22] Filed: Jul. 26, 1984

[51] Int. Cl.[4] ............................................. G06F 13/00
[52] U.S. Cl. ..................................... 364/200; 364/300
[58] Field of Search ... 364/200MS File, 900 MS File, 364/300

[56] References Cited

U.S. PATENT DOCUMENTS

| | | | |
|---|---|---|---|
| 3,588,839 | 6/1971 | Belady et al. | 364/200 |
| 3,889,237 | 6/1975 | Alferness et al. | 364/200 |
| 3,905,023 | 9/1975 | Perpiglia | 364/200 |
| 4,044,337 | 8/1977 | Hicks et al. | 364/200 |
| 4,077,059 | 2/1978 | Cordi et al. | 364/200 |
| 4,084,231 | 4/1978 | Capozzi et al. | 364/200 |
| 4,084,233 | 4/1978 | Handly et al. | 364/200 |
| 4,394,733 | 7/1983 | Swenson | 364/200 |
| 4,399,506 | 8/1983 | Evans et al. | 364/200 |

OTHER PUBLICATIONS

John Kaunitz et al, "Data Base Backup-The Problem of Very Large Data Bases," *The Australian Computer Journal*, vol. 13, No. 4, November 1981, pp. 136-142.
Houtan Aghili et al, "A Practical Guide to the Design of Differential Files for Recovery of On-Line Databases," *ACM Transactions on Database Systems*, vol. 7, No. 4, Dec. 1982, pp. 540-565.
D. J. Rosenkrantz, "Dynamic Database Dumping".

*Primary Examiner*—Archie E. Williams
*Assistant Examiner*—Florin Munteanu
*Attorney, Agent, or Firm*—Jerry W. Herndon

[57] ABSTRACT

A method of generating a backup copy of a database system. Modifications made to the database since the generation of a prior backup copy are summarized in a bit map on a page basis. When the next backup copy is made, only modified pages are transmitted and merged with the prior copy. Plural backup passes are made. New modifications are allowed to occur to the database on all but the last pass. Any database modification made at an address that has already been examined during a pass is backed-up during the next pass. Modifications are locked out at the beginning of the last pass to allow the final generation of a consistent and complete backup copy.

10 Claims, 6 Drawing Figures

SM MEM

DIFFERENTIAL UPDATE MSG FROM SM

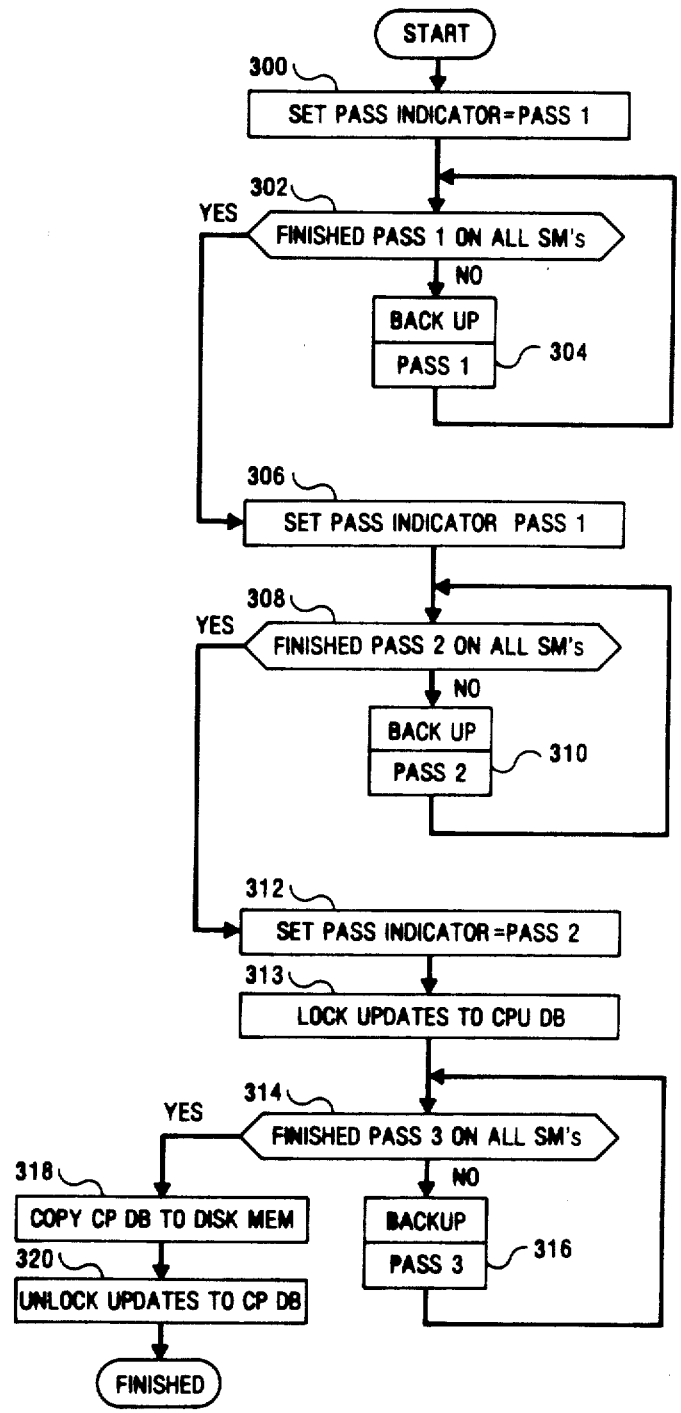

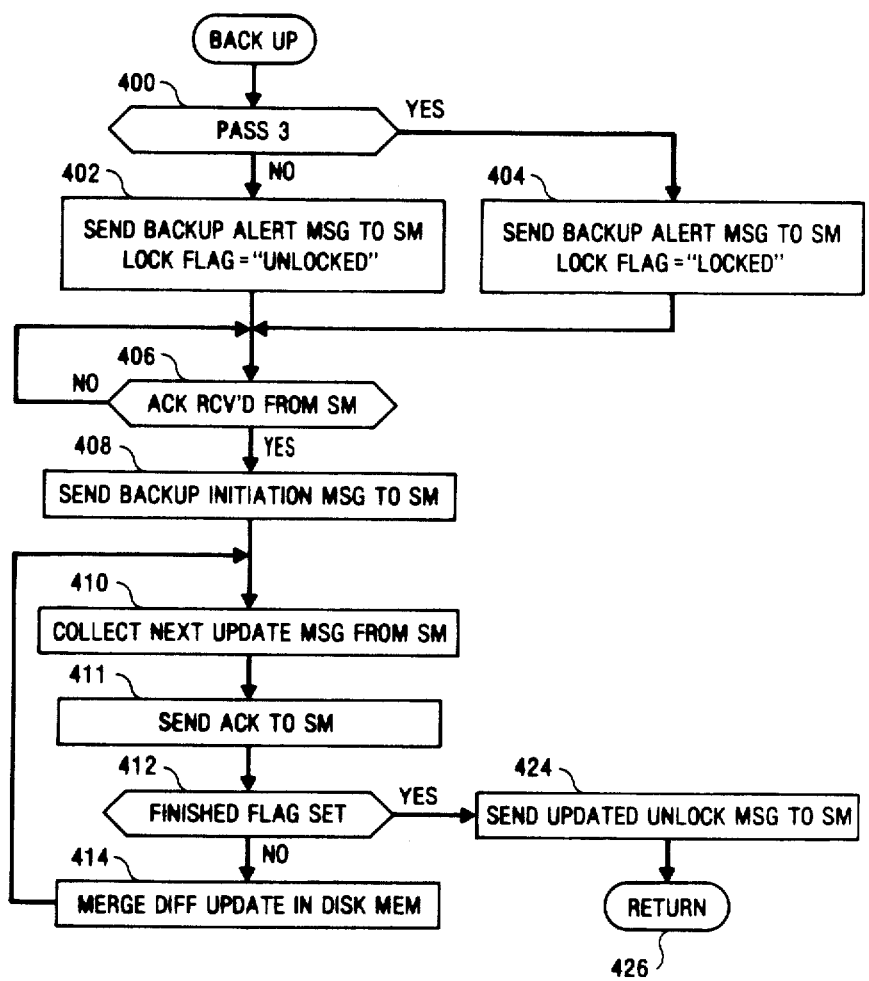

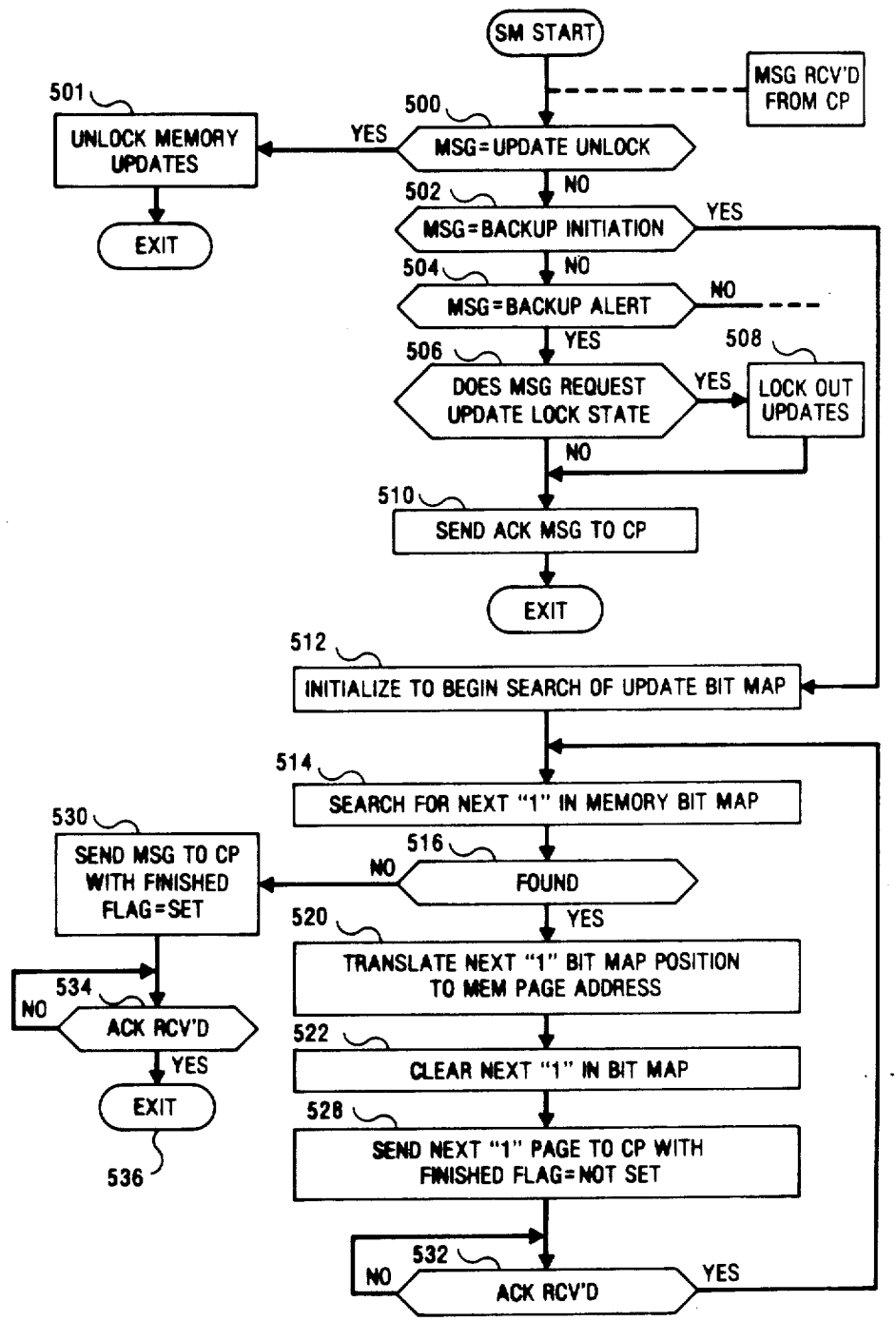

DATABASE BACKUP METHOD

TECHNICAL FIELD

The Invention relates to database systems in general and, in particular, to methods of producing backup dumps of the contents of database systems.

BACKGROUND OF THE INVENTION

There is a need in virtually all database systems to periodically produce a backup copy, or dump, of the contents of the stored information in the system. This is because the stored information in databases typically changes over time. A backup copy of the contents of a database at some point in time assures that the database can be restored to the state existing at that point in time in case of a malfunction that corrupts the database.

The classic method of producing a database backup is to establish a system state in which modifications to the database are disallowed and then to copy the entire database information directly onto a backup disk or tape. Unfortunately, in many types of databases this method incurs a large expense in terms of system unavailability to users. For example, according to an article by Kaunitz and Ekert appearing in the Australian Computer Journal, Vol. 13, No. 4, November 1981, entitled "Database Backup-The Problem of Very Large Databases," the time and resources required to backup databases larger than one billion bytes are viewed as critical problems by the database users.

A similar problem can occur in a small distributed database system if a backup of the distributed database is to be produced on a single resource, such as a disk. If the communication channels between the distributed database are slow or are congested, the real time required to take a full backup of each database site may approach that of a large centralized database. Thus, the disadvantages inherent in the classic method of dumping may be present.

The above article by Kaunitz and Ekert surveys several techniques which have been proposed to alleviate problems of database backup. According to the article, some systems provide an elaborate dynamic backup mechanism whereby database backups are made entirely in the presence of normal user processing, including ongoing modification of the database information. In these techniques, since a backup completed at any given time usually does not represent a consistent state of the database, other means must be used to place the database reloaded from a backup file in a logically consistent state. A typical method of doing this is to maintain an audit trail of modifications to a database as the modifications occur. Having reloaded the database from a backup file, the audit trail must be reprocessed from the earliest point in time reflected by the backup file to the time that the database was corrupted. Then the effect of modifications that were in progress at the time of failure must be removed by some process. Obviously, this is an expensive and complicated process.

Kaunitz and Ekert also mention a differential backup technique as an alternative to the classic backup technique. The database is viewed as consisting of a number of pages of fixed size. A full backup is initially taken of the database. Thereafter, as modifications are made to the database, bit indications are entered into a bit map according to the pages that are affected. Eventually a backup differential file is created by saving only those pages that have been modified as indicated by the bit map. Periodically, this differential backup file is updated with the pages that changed since the last differential backup. At some point, the differential backup file is either merged with the full backup file or a new full backup is taken.

The differential method above also has certain disadvantages. First, a separate differential backup file must be maintained in addition to a full backup file. In the event that the database must be rebuilt, the full backup must be reloaded and then merged with the differential file. Secondly, the method does not address the problems of simply and cheaply allowing the creation of backup files, while also reducing or eliminating the time that a system is unavailable for updates during a backup process.

SUMMARY OF THE INVENTION

The above problems are solved and an advance is made in the art in a method of generating a backup copy of a database system. Modifications made to the database since the generation of a prior backup copy are summarized in a bit map on a page basis. When the next backup copy is made, only modified pages are transmitted and merged with the prior copy. Plural backup passes are made. New modifications are allowed to occur to the database on all but the last pass. Any database modification made at an address that has already been examined during a pass is backed-up during the next pass. Modifications are locked out at the beginning of the last pass to allow the final generation of a consistent and complete backup copy. The method provides a simple and efficient means of generating backups while reducing the amount of time that a database is unavailable to its users for modifications. Most of the database modifications are backed-up during the initial pass or passes while modifications are still allowed. Any residual modifications occurring during the initial pass or passes are backed-up during the final pass when additional modifications are disallowed.

The preferred and disclosed embodiment of the invention is in a distributed database system involving slow communication channels between each of the individual databases and a central processor. This system may be viewed as equivalent, in terms of the time required to generate a backup, to a large database in which the backup time may be a problem. Two passes are made in the preferred embodiment. The individual databases are sequentially backuped during each pass. The individual database being backuped at any given time is locked to modifications during the last pass. This assures that virtually the distributed database as a whole is available to users during almost the entire time required to generate the backup.

BRIEF DESCRIPTION OF THE DRAWING

In the Drawing,

FIG. 3 shows an illustrative flowchart of the main backup program used to control the central processor during backup generation;

FIG. 4 shows illustrative flowchart details of a backup subroutine called by the main program of FIG. 3;

FIG. 5 shows illustrative flowchart details of a backup program located in memory at each of the switch modules.

DETAILED DESCRIPTION

Figure 1:
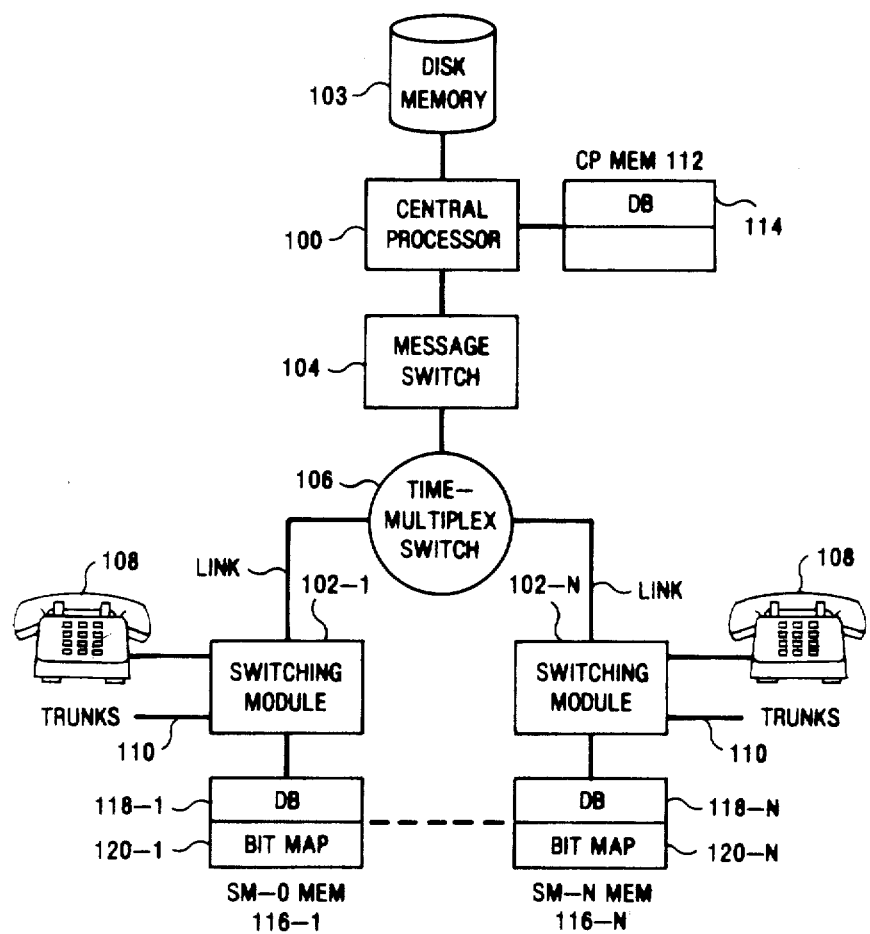
FIG. 1 is a block diagram of a distributed computer-controlled telephone system, including a central processor and one or more switching modules, used to practice the invention.

FIG. 1 shows a simplified block diagram of a distributed number 5 electronic switching telephone system, manufactured by AT&T Technologies, Incorporated. This system is described in the November, 1981 Bell Laboratories Record, beginning at page 258 and in the December, 1981 Bell Laboratories Record beginning at page 290. This system is used to illustrate the principles of the invention. Fundamentally, the system comprises a central processor 100 and one or more switching modules 102-1 to 102-N. In the illustrative system, central processor 100 is a commercially available 3B-20D processor, also manufactured by AT&T Technologies, Incorporated. The 3B-20D processor is described in the March, 1981 Bell Laboratories Record beginning at page 66. It handles the functions that require centralized intelligence, including allocation of resources, overall maintenance, and interface with operations support systems for record keeping, troubleshooting, and so forth.

The central processor 100 is connected to the switch modules a message switch 104 and a time-multiplexed switch 106. Message switch 104 directs the routing of control messages between central processor 100 and the switch modules and between the switch modules themselves. These messages travel through the time-multiplex switch 106.

The switch modules 102 are microprocessor controlled units that provide most call processing functions. They provide the interfaces between the system and stations and trunks 108 and 110. Each switch module contains a time slot interchange unit that performs the first stage of switching. Connections involving more than a single switch module are provided by the time-multiplex switch 106.

Central processor 100 is associated with a random access memory 112, part of which is a CP database 114. This database contains such items as office dependent data and customer data that requires centralized access for functions performed by CP 100. Each of the switch modules 102-1 through 102-N also is associated with a separate random access memory 116-1 through 116-N, part of which is a switch module database (SMDB) 118-1 through 118-N. The SMDBs typically contain office dependent data individual to the SM, such as station and trunk appearances, and feature data specific to the stations served by the SM. The CP database 114 and the SM databases 118 make up a distributed database of the system. CP 100 is also associated with a disk memory 103 which, among other things, is used to store a most recent backup copy of the distributed database.

Figure 2:
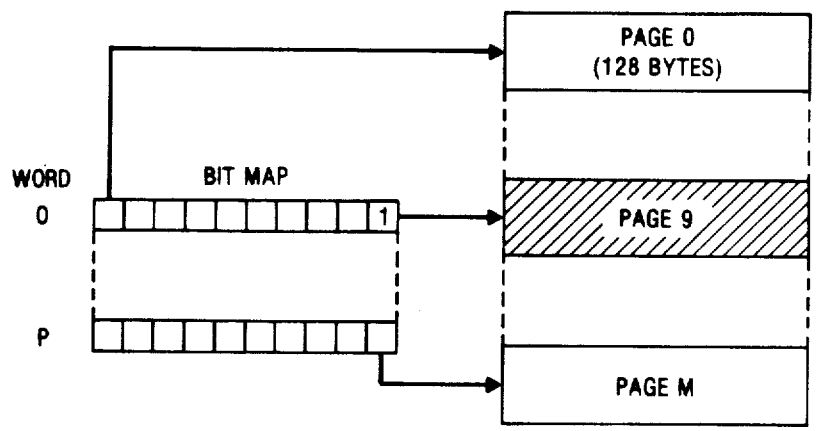
FIG. 2 illustrates how a database memory associated with a switching module is divided into pages and how a bit map is used to record pages of the memory that have been modified since the last generation of a backup copy of the memory.
Figure 6:
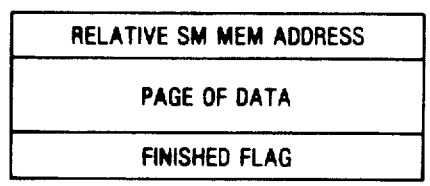
FIG. 6 shows an illustrative format of a differential backup message sent by a switch module to the central processor during a backup process.

Another part of each SM memory 116 is a bit map 120. A SM database 118 is conceptually divided into pages of an arbitrary and fixed size. In the illustrative embodiment, a page is 128 bytes in length. When a modification is made to a SMDB 118, such as activation of a customer calling feature, a "1" is entered into the appropriate bit map at a bit location defining the page containing the modification. This is illustrated in FIG. 2 in which a bit map having words O to P is shown, each assumed to have 10 bits each. To the right of the bit map is a page layout of a SMDB. As shown, the first bit of the bit map is associated with page O of the database. The right-most bit of word O is associated with page 9 and is set to "1", indicating that page 9 has been modified since a last backup copy was taken.

The program control functions described below have been simplified in the interest of brevity and understanding. For example, the flowcharts of FIGS. 3 through 5 are drawn without concern for such things as real time breaks in program flow, which are commonplace in the industry and within the skill of the ordinary art worker.

Database backup may be scheduled to execute periodically, say once a day, or to be executed on demand from, say, a system operator. In either event, entry is made to CP 100 program address START in FIG. 3 to begin the backup. START is a backup control program. Fundamentally, it controls the successive execution of a backup subroutine shown in FIG. 4 for each SM 102 in an office. Each time the backup subroutine is completed on all the SMs of an office, a pass is said to be completed. At least two and as many passes as desired may be performed. In accordance with the invention, modifications are allowed to occur in the SM databases 118 while backup is being performed during all passes except the last pass. The result is that during the initial passes in which the greater number of modifications are expected to be transmitted to CP 100, and thence to disk 103, the SMDBs 118 are still available for modification. During the final pass, SM database modification lockout occurs for only the very short period of time required to transmit the few, if any, modifications that have occurred to a SM database since the immediately preceding pass. Since modified pages are transmitted from each SMDB in sequential order, modifications that occur to a SM database, such as 118-1, at a page location that has already been examined during a pass on the database are backed-up during the next pass on the database.

Three backup passes 1 through 3 are shown in FIG. 3 for illustration, although I have found that in the exemplary system two passes reduce the modification lockout time to a satisfactory value. In FIG. 3, step 300 sets a pass indicator to pass 1. Steps 302 and 304 call the backup subroutine BACKUP sequentially for each SM of an office until the pass is executed on all SMs. At this point, steps 306, 308 and 310 execute pass 2 on all the SMs to backup intervening modifications to the SM databases that arrived too late to be included during pass 1. In accordance with the invention, it is normally expected that the number of modifications backed-up by step 310 is much less than those backed-up by step 304.

After step 310 is executed on all SMs, step 312 sets the pass indicator to pass 2. Step 313 sets an indicator in the CP memory 112 to lockout modifications to the CP database 114. This is done because some CP database modifications cause related modifications to occur in the SM databases. Because modifications are not allowed to an SM that is undergoing a pass 3 backup, modifications must also be disallowed to the CP database.

Steps 314 and 316 now execute the backup subroutine sequentially on each of the SMs 102. When the last SM is completed, step 318 backs up the CP database 114 by copying the entire CP database to disk 103. Since there is no slow communication channel between the CP database and CP 100 and because there is only one CP database, there is no need to backup the CP database in passes. The speed of generating the CP database backup in disk 103 is sufficient to not lock out modifications for an unduly long period of time in this embodiment. However, it is noted that the CP backup could be generated in passes to avoid such a problem if circumstances were to so warrant.

After backup of the CP database is complete, step 320 unlocks the database by resetting the CP lock indication in memory 112. At this point backup is complete. A copy of the CP database as it exists at this point in time and a copy of each of the SM databases as they existed at the time of completion of pass 3 on each individual database exists in disk 103.

FIG. 4 shows the details of the BACKUP subroutine that controls the operations of CP 100. Step 400 determines if pass 3 is in progress. If not, update lockup is not in effect and step 402 causes CP 100 to send a backup alert message to the SM on which this pass is being executed. This alert message includes an "unlocked" flag for passes 1 and 2. On the other hand, if pass 3 is in effect, step 404 sends the alert message to the SM, including a "lock" flag. FIG. 5 shows the details of the program that controls the microprocessors in SMs 102 in response to control messages from CP 100. Step 504 in the SM 102 being addressed recognizes the alert message from CP 100. Step 506 determines if the alert message includes a request to lockout database modifications. If so, step 508 places the lockout state into effect. In either event, step 510 next returns an acknowledge (ACK) message to CP 100 that all is ready to begin the pass.

Step 406 in the CP 100 program recognizes receipt of the ACK message resulting in step 408 transmitting a backup initiation message to the SM. Referring again to FIG. 5, step 502 recognizes the initiation message. In response, step 512 performs certain minor initialization functions such as setting a bit map search pointer to start at the beginning of the bit map. Step 514 begins a search of the bit map shown in FIG. 2 to locate the next "1" therein indicating a page modification. If no "1" is found, steps 516 and 530 result in the generation and transmission of a message to CP 100 with the "finished" flag set. Step 534 looks for a responsive ACK message from CP 100 and terminates SM START program operation when it is received. On the other hand, assuming that a first "1" is found, step 520 translates the position of the "1" in the bit map into a page address in the appropriate SM database 118. Step 522 clears the "1" in the bit map. Step 528 transmits the page associated with the first "1" to CP 100 with the finished flag set to "0" (not finished). Step 532 waits for an acknowledge (ACK) message from CP 100 and continues at step 514 when the ACK message is received to locate the next "1" in the bit map. This process continues until all modified pages as indicated in the bit map are transmitted to CP 100.

The above description of the SM backup program is somewhat simplified from what I have found to be preferred. In the specific system described in FIG. 1, it is efficient to transmit up to five modified pages at a time to CP 100 without waiting for an acknowledge (ACK) message from the CP, rather than one page at a time as illustrated in FIG. 5. This, however, is expected to vary with particular system environments and an appropriate revision of FIG. 5 along these lines is well within the state of art of skilled art workers.

With reference again to the CP 100 program shown in FIG. 4, step 410 receives each transmission of a modified page from an SM then active in a pass. Step 411 returns an acknowledgement (ACK) message to the SM in response to the ACK message. Step 412 tests the "finished" flag in the message to determine if backup is complete on this pass for this SM. If the flag is not set, the message contains a page of data. Step 414 merges the page into the previous backup copy which exists on disk 103. The process then continues on this SM at step 410. Otherwise, step 424 transmits a database update unlock message to the SM just completed. This message is decoded at step 500 of the SM program in FIG. 5, causing step 501 to unlock modifications to the SM database. This step actually is effective only for the last pass (pass 3), since updates are already unlocked for the earlier passes.

Referring again to FIG. 4, at step 426 the CP 100 backup subroutine returns to the appropriate point at step 304, 310 or 316 in the main program after transmitting the unlock message.

In view of the above teaching it is seen that the SM databases 118 are available for updates by users virtually the entire time of backup. Even during the last pass (pass 3), only the SM database actively being backed at any time is locked to updates. Moreover, the differential backup, i.e., the transmission only of modified pages and the merging of the differential updates into the permanent backup disk copy greatly decreases the amount of data required to be processed over the classic full copy method.

It is to be understood that the above-described arrangement is merely illustrative of the application of the principles of the invention and that other arrangements may be devised by those skilled in the art without departing from the spirit and scope of the invention.

What is claimed is:

1. In a distributed data base system having a central computer, a central computer main memory, a central computer mass memory, and a plurality of peripheral data base memories, a method of generating a backup copy of the contents of each of the peripheral data base memories in the central computer mass memory, comprising the steps of setting indications of modifications to the stored contents of a peripheral memory as modifications are made, executing a plurality of update passes on each of the peripheral memories, wherein each pass except the last pass includes allowing update modifications to occur to the peripheral memory being backed-up at a given time during execution of the pass, sequentially examining the modification indications and transmitting indicated modifications of the peripheral memory being backed-up at a given time from the peripheral memory to the mass memory, removing indications of modifications as the modifications are transmitted to the mass memory, executing a last update pass on each of the peripheral memories, wherein the last pass includes inhibiting update modifications to the peripheral memory being updated at a given time, and transmitting all modifications to the peripheral memory being backed-up indicated to be present at the beginning of the last pass to the mass memory.

2. The invention of claim 1 wherein each of the peripheral memories is partitioned into pages of a prescribed size and the setting indication step further comprises setting a bit in a bit map contained in a said peripheral memory and corresponding to a page in the peripheral memory to a prescribed state to indicate a modification to that page.

3. The invention of claim 2 wherein the steps of transmitting modifications further comprises sequentially scanning the bit map for the next bit set to the first prescribed state, setting the next bit found to a second prescribed state, and transmitting the contents of the page of the peripheral memory identified by the bit to the mass memory.

4. The invention of claim 3 wherein the step of sequentially scanning the bit map further comprises resuming the sequential scanning of the bit map at the immediate next bit address after having located a bit set to the first prescribed state and transmitting the corresponding page to the central computer.

5. In a distributed data base system having a central computer, a central computer main memory, a central computer mass memory, and a plurality of peripheral data base memories, a method of generating a backup copy of each of the peripheral data base memories in the central computer mass memory, comprising the steps of A. maintaining a record of modification indications for each of the peripheral data base memories in the respective peripheral data base memory as information is modified in the peripheral memories, B. in response to a request by the central computer, sequentially locating any indications in the record and transmitting the associated modifications from a first one of the peripheral memories to the central computer and thence to the mass memory while allowing additional modifications to occur in all of the peripheral memories, C. clearing a modification indication in the record as each associated modification is transmitted to the central computer, D. repeating steps B and C for each of the remaining peripheral memories, E. at the completion of step D, repeating steps B, C and D zero, one or more times, F. at the completion of step E, inhibiting modifications to the first peripheral memory, G. at the completion of step F, sequentially locating any indication in the record and transmitting associated modifications in the first peripheral memory to the central computer and thence to the mass memory, H. clearing a modification indication in the record as each associated modification is transmitted to the central computer, and I. repeating steps F, G and H for each of the remaining peripheral memories.

6. The invention of claim 5 wherein a said record of modification indications is a bit-map with each bit therein corresponding to a unique and identifiable page of a prescribed size in a corresponding one of the peripheral memories, and the step of maintaining the records further comprises setting to a first prescribed state a bit in the record corresponding to a page which has been modified.

7. The invention of claim 6 wherein steps B and G further comprise sequentially transmitting to the central computer all pages of the peripheral memory whose corresponding bits in the bit-map are set to the first prescribed state.

8. The invention of claim 7 wherein step C further comprises setting appropriate bits in the bit-map to a second prescribed state.

9. The invention of claim 7 wherein the step of sequentially transmitting all pages of the peripheral memory whose corresponding bits in the bit-map are set to the first prescribed state further comprises sequentially searching the bit-map for bits set to the first prescribed state, and transmitting the corresponding peripheral memory pages as such bits are found without regard to preceeding bits of the bit-map which have priorly been examined during the instant pass and whose corresponding peripheral memory pages may have undergone a subsequent modification.

10. The invention of claim 9 further comprising transmitting to the central computer a "finished" indication when the last page of the peripheral memory having its bit in the bit-map set to the first prescribed state has been transmitted to the central computer.

* * * * *